United States Patent
Ohashi et al.

(10) Patent No.: US 6,809,927 B2
(45) Date of Patent: Oct. 26, 2004

(54) LIQUID CIRCULATION COOLING SYSTEM FOR ELECTRONIC APPARATUS

(75) Inventors: Shigeo Ohashi, Tsuchiura (JP); Yoshihiro Kondo, Tsuchiura (JP); Rintaro Minamitani, Tsuchiura (JP); Takashi Naganawa, Tsuchiura (JP); Yuuji Yoshitomi, Tsuchiura (JP); Masato Nakanishi, Tsuchiura (JP); Hajime Katou, Tsuchiura (JP); Tsuyoshi Nakagawa, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/239,141
(22) PCT Filed: Jul. 10, 2002
(86) PCT No.: PCT/JP02/07007
§ 371 (c)(1), (2), (4) Date: May 9, 2003
(87) PCT Pub. No.: WO03/024177
PCT Pub. Date: Mar. 20, 2003

(65) Prior Publication Data
US 2004/0008475 A1 Jan. 15, 2004

(30) Foreign Application Priority Data
Sep. 7, 2001 (JP) .................................... 2001-271159

(51) Int. Cl.⁷ ................................................ H05K 7/20
(52) U.S. Cl. .................... 361/699; 361/687; 165/80.4; 165/104.33; 174/15.1
(58) Field of Search ................................ 316/687–689, 316/698, 699, 709–711; 257/714; 174/15.1; 165/80.4, 104.33

(56) References Cited

U.S. PATENT DOCUMENTS

| | | | | |
|---|---|---|---|---|
| 5,285,347 A | * | 2/1994 | Fox et al. | 361/699 |
| 5,394,936 A | * | 3/1995 | Budelman | 165/104.33 |
| 5,646,824 A | | 7/1997 | Ohashi et al. | |
| 5,731,954 A | * | 3/1998 | Cheon | 361/699 |
| 5,764,483 A | | 6/1998 | Ohashi et al. | |
| 6,166,907 A | * | 12/2000 | Chien | 361/699 |
| 6,234,240 B1 | * | 5/2001 | Cheon | 165/80.3 |
| 6,510,052 B2 | * | 1/2003 | Ishikawa et al. | 361/687 |

FOREIGN PATENT DOCUMENTS

| | | | |
|---|---|---|---|
| JP | 3-208365 | 9/1991 | |
| JP | 5-264139 | 10/1993 | |
| JP | 6-266474 | 9/1994 | G06F/1/20 |
| JP | 7-142886 | 6/1995 | H05K/7/20 |
| JP | 2001-024372 | 1/2001 | |
| JP | 2001-142573 | 5/2001 | |
| JP | 2003-014747 | 1/2002 | |

* cited by examiner

Primary Examiner—Boris Chervinsky
(74) Attorney, Agent, or Firm—Antonelli, Terry, Stout & Kraus, LLP (57) ABSTRACT

In the structure of an electronic apparatus, in which cooling of an heat-generating element is conducted through circulation of a liquid, in particular, for providing a liquid-cooling structure of being high in reliability, while also considering safety and assembling property into the consideration, wherein a water-cooling jacket 8 is thermally connected with a heat-generating element 7, while thermally connecting a heat-radiation pipe 9 with a heat-radiation plate 10 provided on a rear surface of a display 2, wherein a coolant liquid is circulated between the water-cooling jacket 8 and the heat-radiation pipe 9, by means of a liquid driving device 11. The heat-radiation pipe 9 is connected onto a whole area of the heat-radiation plate, like crawling thereupon. A tank 14 is provided in an upper portion of the heat-radiation plate 10, and is connected with the heat-radiation pipe 9.

20 Claims, 3 Drawing Sheets

A-A CROSS-SECTION

FIG. 3(d)

B-B CROSS-SECTION

C-C CROSS-SECTION

LIQUID CIRCULATION COOLING SYSTEM FOR ELECTRONIC APPARATUS

TECHNICAL FIELD

The present invention relates to an electronic apparatus, in which a semiconductor elements generating heat therefrom is cooled by a liquid circulating therein.

BACKGROUND ART

As conventional electronic apparatuses, the structure thereof is already known, for example, in Japanese Patent Laying-Open No. Hei 6-266474 (1994), and Japanese Patent Laying-Open No. Hei 7-142886 (1995), etc.

First of all, in the Japanese Patent Laying-Open No. Hei 6-266474 (1994), for example, is shown the structure of an electronic apparatus, comprising a main housing or case, within which is stored a wiring or circuit board mounting a heat-generating element thereon, and a housing or case of a display apparatus, which has a display panel and is attached onto the main housing rotatably, wherein a heat-receiving jacket attached to the heat-generating element, a heat-radiation pipe, and a liquid driving mechanism are connected with one another through flexible tubes.

Further, in the Japanese Patent Laying-Open No. Hei 7-142886 (1995), there is shown an example, in which the housing is made of a metal, for example, in the structure shown in the Japanese Patent Laying-Open No. Hei 6-266484 (1994).

In those examples, heat generated in the heat-generating element is transferred to the water-cooling jacket, and then the heat is transferred from the water-cooling jacket to the heat-radiation pipe by driving a liquid through a liquid driving mechanism, thereby being radiated into the air outside.

With such the electronic apparatuses, as being represented by a portable personal computer, etc., a tendency of increase in high heat generation of an element is remarkable accompanying with an improvement in performances thereof. On the other side, miniaturization or small-sizing and/or thinning in sizes of the housing is still desired or demanded, so as to be fit to be carried with.

Any one of those conventional arts mentioned above has the structure, so that the heat generated in the heat-generating element is transferred to the display side, thereby to be irradiated thereon, with respect to the high heat generation of the heat-generating element. The transfer of heat from the heat-generating element to the display side is carried out through driving a liquid between both of them. In the structure of those conventional arts, the liquid passes by in the vicinity of the electronic circuits, however no consideration is paid upon safety in the case where the electronic circuits and the liquid co-exist, or upon assembling property thereof.

DISCLOSURE OF THE INVENTION

An object is, therefore according to the present invention, to provide an electronic equipment or apparatus, being improved in the safety in the case where the electronic circuits and the liquid co-exist, and the assembling property, etc.

The object mentioned above, according to the present invention, can be achieved by an electronic apparatus, receiving a liquid circulation flow passage within a case, comprising: a water-cooling jacket being thermally connected with a heat-generating element; a heat-radiation pipe being connected to said water-cooling jacket; a tank being connected to said heat-radiation pipe; and a liquid driving means being connected to said tank, wherein an anti-freezing fluid is encloses within said tank, and said anti-freezing fluid is circulated within said liquid circulation flow passage by means of said liquid driving means.

Also, the object mentioned above, according to the present invention, can be achieved by the electronic apparatus, as described in the above, wherein a collection means for said anti-freezing fluid is provided in a portion of said liquid circulation flow passage.

And also, the object mentioned above, according to the present invention, can be achieved by an electronic apparatus, receiving a liquid circulation flow passage within a case, comprising: a water-cooling jacket being thermally connected with a heat-generating element; a heat-radiation pipe being connected to said water-cooling jacket; a tank being connected to said heat-radiation pipe; and a liquid driving means being connected to said tank, wherein said water cooling jacket and said liquid driving means are attached onto a first heat-radiation plate while said heat-radiation pipe and said tank onto a second heat-radiation plate, and said first and said second heat-radiation plates are made detachable into said case.

Also, the object mentioned above, according to the present invention, can be achieved by the electronic apparatus, as described in the above, wherein said water-cooling jacket is formed from a winding metal pipe, and said metal pipe is extended, so as to be connected with a flexible tube connected to said heat-radiation pipe.

Also, the object mentioned above, according to the present invention, can be achieved by the electronic apparatus, as described in the above, wherein said liquid circulation flow passage is attached on an interior surface of said case, while said water-cooling jacket is in contact with a circuit board mounting said heat-generating element thereon.

Also, the object mentioned above, according to the present invention, can be achieved by the electronic apparatus, as described in the above, wherein a pipe of said water-cooling jacket at an exit side and a pipe of said liquid driving means at an inlet side are thermally connected with each other.

Also, the object mentioned above, according to the present invention, can be achieved by the electronic apparatus, as described in the above, wherein thermo-conductive means is connected to a pipe of said liquid driving means at an inlet side thereof.

Also, the object mentioned above, according to the present invention, can be achieved by the electronic apparatus, as described in the above, wherein said tank is made detachable with respect to said heat-radiation pipe, thereby providing collection means of the anti-freezing fluid within said liquid circulation flow passage.

Also, the object mentioned above, according to the present invention, can be achieved by the electronic apparatus, as described in the above, further comprising a detection means for detecting a change amount of the liquid within said liquid circulation flow passage, and an alarm means inputting an output from said detection means.

Also, the object mentioned above, according to the present invention, can be achieved by the electronic apparatus, as described in the above, further comprising a detection means for detecting leakage of the liquid from said liquid circulation flow passage, and a stoppage means inputting an output from said detection means and for stopping an electric power of said electronic apparatus.

Also, the object mentioned above, according to the present invention, can be achieved by the electronic apparatus, as described in the above, wherein within said case is provided an accumulation portion for specifying a portion of said liquid leakage in said liquid circulation flow passage and for accumulating the liquid leaking from said liquid leakage portion.

And, the object mentioned above, according to the present invention, can be achieved by an electronic apparatus, receiving a liquid circulation flow passage within a case, comprising: a heat-generating element mounted onto an electronic circuit on a circuit board; a water-cooling jacket being thermally connected with a heat-generating element; a heat-radiation pipe being connected to said water-cooling jacket; a tank being connected to said heat-radiation pipe; and a liquid driving means being connected to said tank, wherein a partition is provided for separating said electronic circuit from said liquid circulation flow passage.

BRIEF DESCRIPTION OF THE DRAWINGS

FIGS. 3(a) and 3(b) are a front view and a A—A cross-section view of a water-cooling jacket.

BEST MODE FOR CARRYING OUT THE INVENTION

An electronic apparatus, such as a so-called personal computer, includes a notebook-type personal computer, which is portable, and a desktop-type personal computer, which is mainly used on a desk. In each of those personal computers, being demanded to be higher and larger in processing speed and capacity thereof every year, temperature of the heat generation of a CPU, i.e., the semiconductor element, comes up to be higher, as a result of those requirements. And it is expected that this tendency will continue further in future.

On the contrary to this, in general, the personal computers are of an air-cooling type by means of a fan or the like, at the present situation. This air-cooling type has a limit in the capacity of heat-radiation, and there is a possibility that it cannot follow the heat-radiation of the CPU, which is on the tendency of high heat-generation as was mentioned in the above. However, it may be possible to treat with, by making the fan rotating with higher speed and/or large in the size thereof, however it brings about an effect against low-noise generation and/or light-weighting, therefore it is not a realistic solution.

On the other hand, as a method for heat-radiation, to be replaced with heat-radiation of the conventional air-cooling type, there is a device for cooling the CPU by circulating a cooling medium or coolant, such as water, etc.

Such the cooling device is mainly used in cooling system for a large-scaled computer, being located in a company or bank, etc., and wherein cooling water is circulated compulsively by means of a pump and is cooled down by a refrigerator for exclusive use thereof, thereby being large in the scale or sizes.

Accordingly, such the cooling device by means of water as was mentioned above is unable at all, to be mounted into the notebook-type personal computer, which is moved or carried with frequently, and into the desk-top personal computer, which also may be moved due to re-arrangement in an office, etc., even if this cooling device can be made small in sizes, for example.

Then, as in the conventional arts mentioned above, various devices are studied, for achieving the cooling by means of the water, which can be mounted on a small-sized personal computer, however the temperature of heat-generation by the semiconductor element was not so high as in the recent year, at the time when such the conventional arts were made and filed as the patent applications, therefore no personal computer equipped with the water-cooling device comes out as an actual product available on markets, until up to now.

On the contrary to this, according to the present invention, it is possible to achieve small-sizing of the water-cooling device, greatly, by building up the housing defining an external form of the computer main body, made of aluminum alloy or magnesium alloy, etc., being superior in heat-radiation, thereby enabling to mount the water-cooling device onto the personal computer.

By the way, in case of installing the cooling device through liquid circulation into the electronic apparatus, the most important factor is safety. If assuming that the circulating water contacts with the electronic parts due to leakage of the water, then it brings about short-circuiting therein, therefore it is needless to say that it gives a big damage upon the electronic apparatus. Accordingly, the present inventors studied various actual models of the electronic apparatuses, each being mounted with a water-cooling device, upon which the safety is considered with giving the highest priority.

As a result of this, the mounting structure comes to be apparent, being the highest in the safety of the water-cooling device.

Hereinafter, explanation will be made on an embodiment according to the present invention, by referring to FIG. 1 attached.

Figure 1:
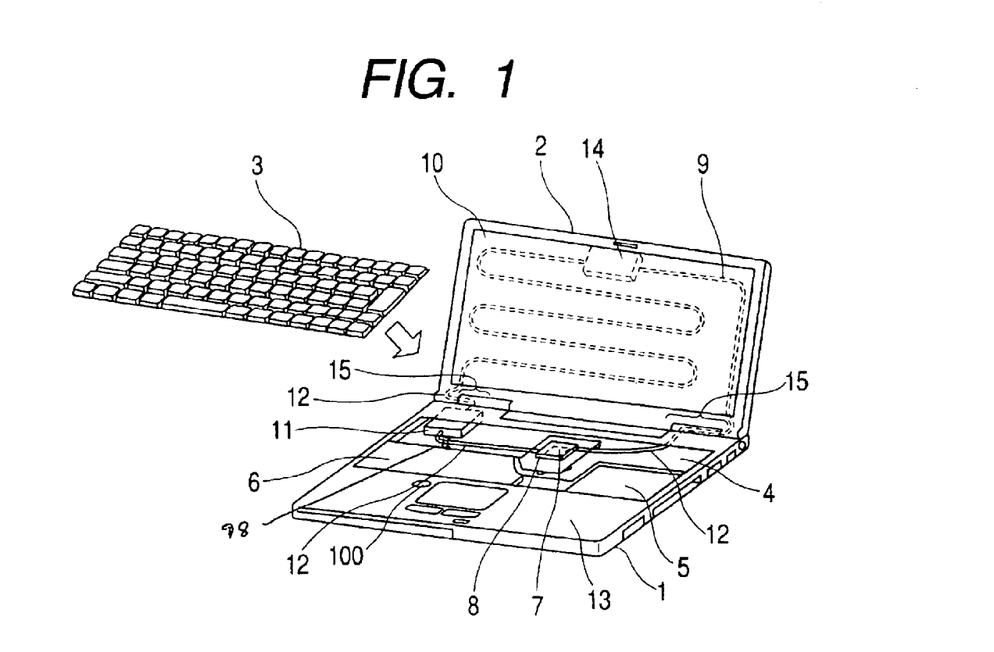
FIG. 1 is a perspective view of an electronic apparatus, according an embodiment of the present invention.

FIG. 1 shows a perspective view of an electronic apparatus, according to the embodiment of the present invention.

In FIG. 1, the electronic apparatus is constructed by a main case 1 provided with a keyboard 3 therein, and a display case 2 having a display thereon. This display 2 is supported onto the main case 1 through a hinge portion 15, rotatably. On the main case 1 are provided a wiring or circuit board 4, on which a plural number of elements are mounted, a hard-disc drive 5, an auxiliary memory device (for example, a floppy-disc drive, a CD drive, etc.) 6, and a battery 13, etc., other than the keyboard 3.

On the wiring or circuit board 4, there is mounted an element, such as a central processing unit 7 (hereinafter, being described by "CPU") having a large heat-generation amount, in particular. Onto the CPU 7 is attached a water-cooling jacket 8, so as to be contact therewith, thermally. The water-cooling jacket 8 and the CPU 7 are connected with therebetween, through a soft thermo-conductive material (i.e., a mixture of thermo-conductive fillers of aluminum oxide within Si rubber, for example).

However, by making the display case 2 itself of a metal, such as aluminum alloy, magnesium alloy, etc., it may be possible to connect the heat-radiation pipe 9 directly onto the display case 2, without the heat-radiator plate 10.

Within the main case 1 is provided a pump as a liquid driving means. The water-cooling jacket 8 and the heat-radiation pipe 9, including the pump 11 thereto, are connected with one another through flexible tubes 12, respectively, thereby circulating a coolant liquid enclosed in an inside thereof, by means of the pump 11 (hereinafter, the entire of circulating route of the coolant liquid, which is attached onto the display case and the main case, is called by a "piping system").

The tank 14 should be made to have such a capacity, so as to secure an amount of a liquid therein, being necessary for cooling within a circulation flow passage, even if it is lessened, due to penetration or permeation thereof, or the like, from the flexible tubes 12.

The flexible tube 12 must be used at least in a hinge portion 15, since the display case 2 is always opened and closed, however there is no necessity of connecting with the flexible tubes in the portions other than that.

Thus, using metal pipes in piping between the water-cooling jacket 8 and the hinge portion 15, between the pump 11 and the hinge portion 15, and between the pump 11 and the water-cooling jacket 8, while connecting the metal pipe and the heat-radiation pipe 9 by the flexible tubes 12, at least only in the portion of the hinge portion 15, thereby making the ratio of the metal piping portion, occupying in the entire piping, as large as possible, enables to meet the requirement of open-close of the display portion around the hinge portion, as well as, to suppress the penetration or permeation of water from the pipe.

In this case, the piping system is built up, by connecting between the metal pipe from the water-cooling jacket, the flexible tube of the hinge portion, the flexible tube of the heat-radiation pipe and the hinge portion, the metal pipe to the pump, and the metal pipe to the water-cooling jacket, in that sequence. In the connecting portions of this structure, an appropriate joint and/or a clamping band (in plate-like, or coil spring-like shape) are used for preventing from slipping off. Further, the connecting portions may be coated with a resin for the purpose of protection from leakage of water.

As a result of various studies made on the flexible tube 12, being less in the water permeation therethrough, it can be acknowledged that a butyl rubber is most suitable, which is mainly used as a connection rubber in a radiator for use in an automobile or as a tube of a tire, etc.

Next, explanation will be given in more detail about the heat-radiation plate, which is attached on the piping system mentioned above (including the water-cooling jacket 8, the heat-radiation pipe 9, the pump 11, the flexible tube 12, and the tank 14), by referring to FIG. 2 attached.

Figure 2:
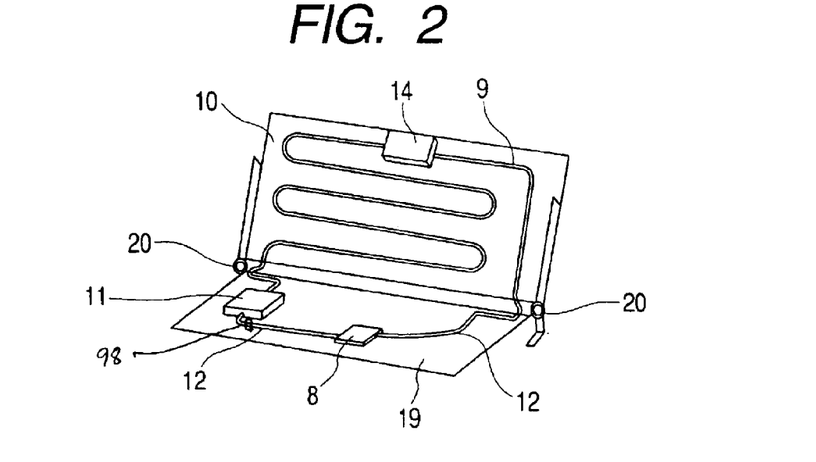
FIG. 2 is a perspective view of a heat-radiation metal plate applied in the above-mentioned electronic apparatus, according the embodiment of the present invention.
Figure 3A:
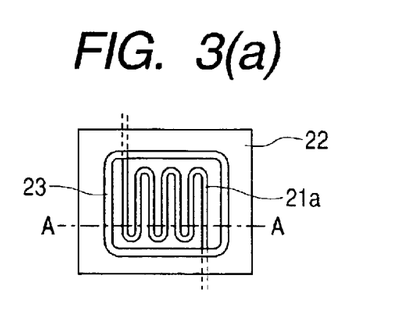
Figure 3B:
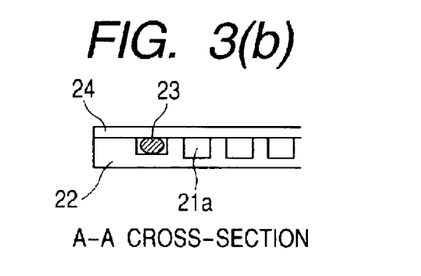
Figure 3C:
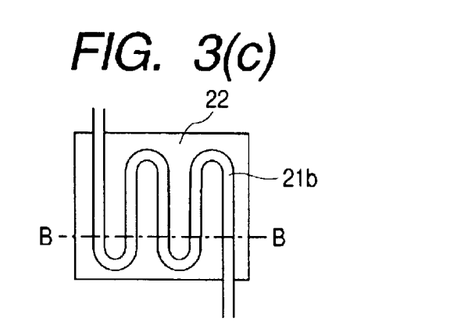
FIGS. 3(c) and 3(d) are a front view and a B—B cross-section view of other water-cooling jacket, which are applied in the above-mentioned electronic apparatus, according to the embodiment of the invention.
Figure 3D:
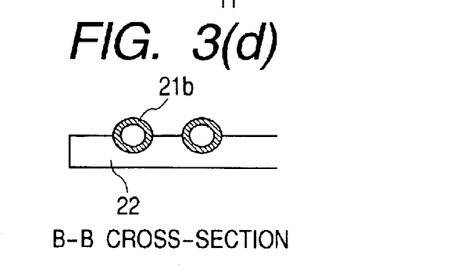

FIG. 2 is a perspective view of a metal heat-radiation plate.

In FIG. 2, on the metal heat-radiation plate 19 on a side of the main case 1 are attached the water-cooling jacket 8, the pump 11, and the flexible tube 12 among the piping system mentioned above. Also, this metal heat-radiation plate 19 conducts the heat-radiation generated from heat-generating parts other than the CPU 7. Onto the metal heat-radiation plate 10 on a side of the display case 2 is attached the heat-radiation pipe 9 and the tank 14 among the piping system mentioned above. Those metal heat-radiation plates 10 and 19 are attached to the hinge 20 therebetween, thereby being assembled in a rotatable manner and made in form of a unit.

In this manner, combining the piping system and the metal heat-radiation plates 10 and 19, in the form of a unit, enables the metal heat-radiation plates 10 and 19 to be detachable from the main case 1 and the display case 2, easily.

On the other hand, it may be also possible to install the piping system directly on an interior surface of the main case 1 in advance. In this instance, since the wiring or circuit board 4 is located in an upper part of the water-cooling jacket 8, the wiring or circuit board can be attached and/or detached easily.

According to those embodiments, since the piping system is fixed onto the heat-radiation plate and the main case, etc., in advance, in addition to that work of installing and replacing of the wiring or circuit board 4 becomes easy, it is also possible to protect the flexible tube 12 from buckling and to prevent the pipe from slipping off.

Herein, explanation will be given on the route of heat-radiation in this cooling device.

Heat generated from the CPU 7 is transferred to the coolant liquid communicating within the water-cooling jacket 8, and is radiated from the metal heat-radiation plate 10 provided on the rear surface of the display through the surface of the display case 2 into the air outside, during the time when it passes through the heat-radiation pipe 9. The coolant liquid, being lowered in temperature with this, is then sent out to the water-cooling jacket 8 through the pump 11, again.

In the embodiment mentioned above, the heat-generating element to be cooled down in temperature by means of the water-cooling jacket 8 is only (1) piece, however in the place thereof, a plural number of heat-generating elements may be cooled down by connecting a plural number of the water-cooling jackets provided in series or in parallel.

Next, the details of the structure of the water-cooling jacket will be explained by referring to FIGS. 3(*a*) to 3(*d*).

FIGS. 3(*a*) and 3(*b*) are a front view and an A—A cross-section view thereof, for showing the structure of the base 22 made from an aluminum block, being formed with a flow passage 21*a* therein and sealed with a cover 24 through an O-ring 23.

On the other hand, FIGS. 3(*c*) and 3(*d*) are a front view and a B—B cross-section view thereof, for showing the structure, wherein a flow passage built up by winding a metal groove 21*a* is bonded on the base 22 made of a metal (such as, aluminum, copper, etc.).

In FIGS. 3(*a*) and 3(*b*), on the base 22 is formed a winding groove 21*a* in advance. In an outer periphery of this winding groove 21*a*, there is provided a groove to be inserted with the O-ring therein. Closing the grooves 21*a* by means of the cover 24 forms one (1) piece of the winding groove 21*a*, into which the coolant liquid can flows. The O-ring is provided for the purpose of preventing the coolant liquid leaking from the groove 21*a*, and the O-ring is suppressed by the cover 24, thereby the groove 21*a* being hermetically sealed.

In FIGS. 3(*c*) and 3(*d*), on the base 22 are formed with a winding groove in advance, in the similar manner to that shown in FIGS. 3(*a*) and 3(*b*) mentioned above, filling with the shape of the metal groove 21*b*, thereby enlarging contact area between the base 22 and the metal pipe 21a. In the present embodiment, since the groove does not define the flow passage for the coolant liquid by itself as in the embodiment shown in FIGS. 3(a) and 3(b) mentioned above, none of such the cover 24 or O-ring is necessary, therefore being simple in the structure.

Although the explanation was given on the piping system build up by the water-cooling jacket, the flexible tube, the metal pipe, the flexible tube in the hinge portion, aligned in that sequence thereof, in the above-mentioned embodiment shown in FIG. 1, however according to the present embodiment, the piping system can be built up by extending the metal groove 21a up to the flexible tube 12 used in the hinge portion (see FIG. 1), to be connected therewith.

Further, while connecting the base to the extended portion of the metal groove 21a, it is also possible to build up the water-cooling jackets in a plural number thereof, by one (1) piece of the metal pipe, thereby cooling the plural number of the heat-generating elements.

By the way, with the electronic apparatus explained in the present embodiments, in a manufacturing works or factory, the pump 11 and the movable portion, such as, the flexible tube(s) disposed in the hinge portion 15, etc., are received within the equipment or apparatus thereof, under the condition of being filled up with the coolant liquid therein.

Such the electronic equipments or apparatuses are shipped from the manufacturing works or factory, and then are distributed domestically, and are also imported into every countries of the world. When being transported to each area in this manner, mainly an airplane is used, and when the plane flies on the upper sky of 20,000 m in height, the temperature within the freight room thereof comes down to 0° C. or lower than that. Therefore, there is a probability those parts are deformed and/or destroyed due to the cubical expansion, which is caused by freezing of the coolant liquid. Also, when being transported in a cold district, such as Hokkaido (i.e., a northern area of Japan), and stored and kept in a warehouse, the temperature comes down to 0° C. or lower than that, in the circumference where the electronic equipments or apparatuses are located. In such the case, there is also a probability that the coolant liquid is frozen.

In this manner, on the assumption that it is laid in the circumference being equal to 0° C. or lower than that, it is preferable that an anti-freezing solution or fluid is applied as the coolant liquid to be used in such the electronic apparatus. However, in the case where temperature of the cooling liquid will not come down to 0° C. or lower than that, or where no problem occurs if the coolant liquid is frozen (i.e., in case of the structure being able to absorb the cubical expansion), the water may be applied as the coolant liquid.

By the way, in general, the viscosity of the anti-freezing solution or fluid is higher than that of the water, and also is larger in temperature dependency thereof. Accordingly, the viscosity of the anti-freezing solution or fluid comes up to high when being in a system initiation, in particular, when temperature of the air outside is low. For this reason, there is a possibility that a flow amount of circulation cannot be secured sufficiently, which is necessary for cooling down the heat-generating element, thereby bringing about an abrupt increase of temperature in the CPU.

The present inventors understood that, for dissolving such the problems mentioned above, it is preferable to connect the pipe at the outlet of the water-cooling jacket, where the temperature rises up at the fastest, to the pipe at the inlet of the pump, thermally, so as to increase the liquid temperature flowing into the pump as quickly as possible, thereby lowering the viscosity, for the purpose of advancing recovery the flow amount and securing the necessary flow amount of circulation.

Then, explanation will be given on an electronic apparatus, according to other embodiment of the present invention, by referring to FIGS. 4(a) and 4(b) attached herewith.

Figure 4A:
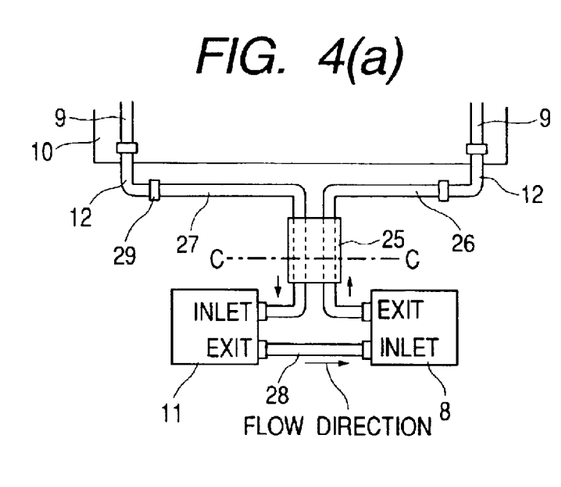
FIGS. 4(a) and 4(b) are an outlook structure view of a cooling device and a C—C cross-section view thereof, in the above-mentioned electronic apparatus, according to the embodiment of the invention.
Figure 4B:
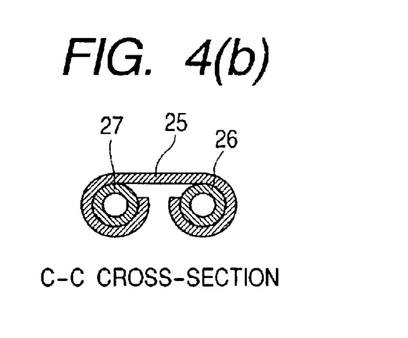

FIGS. 4(a) and 4(b) are an outlook structure view of the electronic apparatus and a C—C cross-section view of a part thereof, according to the other embodiment of the present invention.

In FIGS. 4(a) and 4(b), the piping system shown in FIG. 1 mentioned above is built up with a water-cooling jacket 8, a heat-radiation pipe 9 attached onto the metal heat-radiation plate 10, and a pump, arranged in that sequence thereof. An exit of the pump 11 and an inlet of the water-cooling jacket 8 are connected by a metal pipe 28 therebetween, and further, between an inlet of the pump 11 and a flexible tube 12, and between an exit of the water-cooling jacket 8 and the flexible tube 12, are connected by metal pipes 26 and 27, respectively. Those connection portions are connected by means of joints 29.

Those metal pipes 26 and 27 are thermally connected, by means of a thermo-conductive plate 25, being rounded at both ends of the metal plate, such as, a copper plate, an aluminum plate, etc., to be coincident with the shape of the metal pipes 26 and 27, as is in the C—C cross-section shown in FIG. 4(b).

With this structure, the heat can be transferred from the metal pipe 26, being connected to the exit side of the water-cooling jacket 8 where temperature rises up at the fastest, to the metal pipe 27 connected to the inlet side of the pump 11, through the thermo-conductive plate 25, thereby increasing temperature of the liquid flowing into the pump.

However, the metal pipe 27, which is connected to the inlet side of the pump 11, may be connected with the heat-generating parts other than the CPU, thereby increasing temperature of the liquid flowing into the pump.

By the way, for the method of injecting or supplying the anti-freezing solution or fluid into the cooling device within the electronic apparatus, there can be considered a method of injecting the liquid from an inlet provided in the tank 14, and/or a method of attaching a detachable tank 14 enclosing the liquid therein in advance, etc.

However, in general, the anti-freezing solution or fluid contains various kinds of materials, such as corrosion suppress agents, etc., mixed therein, therefore it brings about a probability of being a cause of the pollution of the environment, etc. For this reason, it is preferable that the anti-freezing solution or fluid is collected when being scrapped. For the purpose thereof, preferably, the anti-freezing solution or fluid can be collected from the inlet of the tank 14 after being accumulated therein in the total amount thereof, or it can be collected together with the tank 14, if being detachable structure.

In more details of the collection method, for example, the pipe connected to the tank 14 is closed or choked at one end thereof, while driving the pump 11, thereby collecting the anti-freezing solution or fluid. Further, with supervising the CPU temperature, operating time, a water amount, etc., by using the CPU itself, it is also possible to notice the necessity of supplement of the anti-freezing solution or fluid to an operator (or, an owner or a manager of the electronic apparatus), and in addition thereto, noticing this to a person of maintenance service, for example, through the network, may enable a maintenance service of the anti-freezing solution or fluid. Also, as one example of the maintenances mentioned above, it may be possible to provide or prepare a system for collecting the anti-freezing solution or fluid before a customer scraps or throws away the electronic apparatus.

In this way, with the structure of the electronic apparatus according to the present invention, the coolant liquid (or the anti-freezing solution or fluid) exists in the vicinity of the electronic circuits, therefore there is a necessity of considering the safety when the liquid comes out from the flow passage at the highest priority.

In the electronic apparatus, the portion where the highest voltage is generated is accommodated or located within the display case, in general. This is, in a sense of separating a portion of the highest voltage away from the user, as well as, for the purpose of preventing a cable connecting the high voltage between the display from passing by the hinge portion where the cable is easily fatigued. However, in the embodiment according to the present invention, since the tank and the heat-radiation pipe are received within that display case, an afraid of contacting between the liquid leakage and the high voltage portion can be fully considered.

Also, in a portion of a battery 13, having a fear of causing abrupt chemical reaction with the water, there is also a necessity of providing the structure for separating from the liquid.

Then, explanation will be given on an electronic apparatus equipped with the structure against the water leakage, according to further other embodiment of the present invention, by referring to FIGS. 5(*a*) and 5(*b*) attached.

Figure 5A:
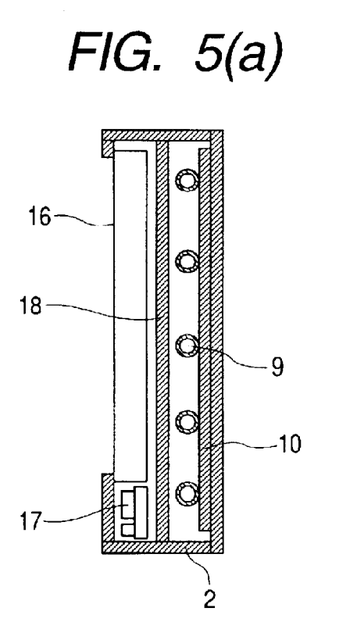
FIGS. 5(a) and 5(b) are cross-section views of a display case of the above-mentioned electronic apparatus, according to the embodiment of the invention.
Figure 5B:
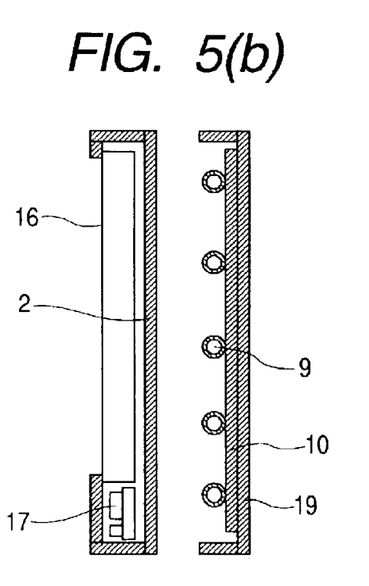

FIG. 5(*a*) is the cross-section view of the display case of the electronic apparatus, according to further other embodiment of the present invention. And, FIG. 5(*b*) is the cross-section view of the display case, shown under the condition that the display case is divided into a display portion and a heat-radiation portion thereof.

In FIG. 5(*a*), a partition or wall 18 is provided for the purpose of separating a display 16 and a high voltage circuit board 17 for use in display driving away from the piping portion (i.e., the metal heat-radiation plate 10 and the heat-radiation pipe 9), within the display case 2 for receiving the display 16 therein.

Also, with the structure shown in FIG. 5(*b*), separating from the display case 2 accomodating the display 16 therein is provided a cover 19, within which is disposed the piping portion (i.e., the metal heat-radiation plate 10 and the heat-radiation pipe 9), and this cover 19 is plated on the rear surface side of the display case 2.

As is shown in those FIGS. 5(*a*) and 5(*b*), since the high voltage circuit board 17 can be separated from the heat-radiation pipe 9 and the tank, therefore, even if the liquid leaks out from a portion of the heat-radiation pipe 9, due to the partition 18, for example, it is possible to prevent the liquid from flowing into a side of the high voltage circuit board 17.

On the other hand, in the battery portion, it is preferable to provide the partition or wall, being like 18 shown in FIG. 5(*a*), in a receiving portion of the battery 13 (see FIG. 1), thereby protecting the battery portion from being invaded by the liquid leaking out from the pipe.

Also, in place of the structure mentioned above, a method or manner may be effective of molding a resin over the electronic circuit portion on the wiring or circuit board 4, but except for a connector or a socket portion, or a method of disposing the pipe under the wiring or circuit board 4, etc.

However, if the liquid comes out, it is necessary to stop the system as soon as possible. For that purpose, it is also possible to provide a sensor 98, as shown in FIGS. 1 and 2, for detecting the water (or the liquid), i.e., for detection of liquid leakage, at a specific location within the electronic apparatus, such as, at the connection portion of the pipe and/or at the portion of the flexible tube 12, etc., for example, thereby initiating processing of stoppage of the system and/or alarming (for example, via a speaker 100 shown in FIG. 1), etc. Also, it may be possible to construct so that, monitoring is always made on the liquid amount (for example, detecting a water surface within the tank 14), so as to catch an abnormal reduce in the liquid amount; thus, for determining the water leakage, and thereby initiating processing of stoppage of the system and/or alarming, etc. However, in this instance, in the location where the sensor is provided, the pipe may be coved with a sleeve, and the sensor is located at an end portion of the sleeve.

With this, the water leakage in the pipe can be sensed at the end portion of the sleeve. Also, for prohibiting the leakage of water at that location from coming outside the electronic apparatus, i.e., for accumulating the liquid within the apparatus, it may be possible to provide a pan, or a method of applying and fixing a hydrophilic polymer at that location, and so on.

Although only the structure is shown in the embodiments mentioned above, wherein the metal heat-radiation plate connected with the heat-radiation pipe is received or accommodated within the display case, however it may possible to construct so that, the metal heat-radiation plate is provided on an inner surface of the main case, so as to obtain the heat-radiation from the surface of the main case.

Furthermore, it may possible to construct so that, the heat-radiation from the surface of the display case and the heat-radiation from the surface of the main case can be obtained in common. Also, by using a heat-exchanger in place of the metal heat-radiation plate, it may be possible to perform the heat-exchange, compulsively, between the air by using a fan or the like. Furthermore, by adding the heat-exchanger on the way of the piping system of the embodiment shown in FIG. 1 (for example, between the water-cooling jacket and the hinge portion), it may be possible to construct so that, the compulsive heat-exchange can be obtained between the air by means of the fan and the heat-radiation from the rear surface of the display in common.

Though are shown the cases where the main case and the display case are constructed by separate cases, respectively, in the embodiments mentioned in the above, however the present invention should not be restricted only thereto, but it is also possible to be applied to an electronic apparatus, such as a so-called desk-top type electronic apparatus, in which the display, the wiring or circuit board mounting the heat-generating element thereon, and other parts, as well, are received or accommodated, for example, or that having no display therewith.

INDUSTRIAL APPLICABILITY

As was fully mentioned in the above, according to the present invention, with an electronic apparatus, in which cooling is achieved by circulating the cooling liquid between the heat-generating element and the heat-radiation pipe provided on a wall surface of the case, it is possible to radiate the heat generated from the heat-generating element from the surface of the case with high reliability.

What is claimed is:

1. An electronic apparatus, receiving a liquid circulation flow passage within a case, comprising:
   a water-cooling jacket being thermally connected with a heat-generating element;
   a heat-radiation pipe being connected to said water-cooling jacket;
   a tank being connected to said heat-radiation pipe; and
   a liquid driving means being connected to said tank;
   wherein an anti-freezing fluid is enclosed within said tank, and said anti-freezing fluid is circulated within said liquid circulation flow passage by means of said liquid driving means; and wherein thermo-conductive means is connected to a pipe of said driving means at an inlet side thereof.

2. An electronic apparatus, as described in claim 1, wherein a collection means for said anti-freezing fluid is provided in a portion of said liquid circulation flow passage.

3. An electronic apparatus, as described in claim 1, wherein said electronic apparatus is a notebook-type personal computer.

4. An electronic apparatus, receiving a liquid circulation flow passage within a case, comprising:
   a water cooling jacket being thermally connected with a heat-generating element;
   a heat-radiation pipe being connected to said water-cooling jacket;
   a tank being connected to said heat-radiation pipe; and
   a liquid driving means being connected to said tank;
   wherein said water-cooing jacket and said liquid driving means are attached onto a first heat-radiation plate while said heat-radiation pipe and said tank are attached onto a second heat-radiation plate, and said first and said second heat-radiation plates are made detachable into said case.

5. An electronic apparatus, as described in claim 4, wherein said water-cooling jacket is formed from a winding metal pipe, and said metal pipe is extended, so as to be connected with a flexible tube connected to said heat-radiation pipe.

6. An electronic apparatus, as described in claim 4, wherein said liquid circulation flow passage is attached on an interior surface of said case, while said water-cooling jacket is in contact with a circuit board mounting said heat-generating element thereon.

7. An electronic apparatus, as described in claim 4, wherein a pipe of said water-cooling jacket at an exit side and a pipe of said liquid driving means at an inlet side are thermally connected with each other.

8. An electronic apparatus, as described in claim 4, wherein thermo-conductive means is connected to a pipe of said liquid driving means at an inlet side thereof.

9. An electronic apparatus, as described in claim 4, wherein said tank is made detachable with respect to said heat-radiation pipe, thereby providing collection means of the anti-freezing fluid within said liquid circulation flow passage.

10. An electronic apparatus, as described in claim 4, wherein said electronic apparatus is a notebook-type personal computer.

11. An electronic apparatus, as described in claim 4, wherein an anti-freezing fluid is enclosed within said tank, and said anti-freezing fluid is circulated within said liquid circulation flow passage by said liquid driving means.

12. An electronic apparatus, receiving a liquid circulation flow passage within a case, comprising: a water-cooling jacket being thermally connected with a heat-generating element; a heat-radiation pipe being connected to said water-cooling jacket; a tank being connected to said heat-radiation pipe; and a liquid driving means being connected to said tank; wherein an anti-freezing fluid is enclosed within said tank, and said anti-freezing fluid is circulated within said liquid circulation flow passage by means of said liquid driving means; and further comprising a detection means for detecting leakage of the liquid from said liquid circulation flow passage, and a stoppage means inputting an output from said detection means and for stopping an electric power of said electronic apparatus.

13. An electronic apparatus, as described in claim 12, wherein within said case is provided an accumulation portion for specifying a portion of said leakage in said liquid circulation flow passage and for accumulating the liquid leaking from said liquid leakage portion.

14. An electronic apparatus, receiving a liquid circulation flow passage within a case, comprising:
   a heat-generating element mounted onto an electronic circuit on a circuit board;
   a water-cooling jacket being thermally connected with a heat-generating element;
   a heat-radiation pipe being connected to said water-cooling jacket;
   a tank being connected to said heat-radiation pipe; and
   a liquid driving means being connected to said tank;
   wherein a partition is provided in at least one of a display portion and battery receiving portion of said electronic apparatus for separating an electronic circuit of at least one of said display portion and said batten, receiving portion from said liquid circulation flow passage.

15. An electronic apparatus, as described in claim 14, wherein said electronic apparatus is a notebook-type personal computer.

16. An electronic apparatus, as described in claim 14, wherein an anti-freezing fluid is enclosed within said tank, and said anti-freezing fluid is circulated within said liquid circulation flow passage by said liquid driving means.

17. An electronic apparatus, receiving a liquid circulation flow passage within a case, comprising: a water-cooling jacket being thermally connected with a heat-generating element; a heat-radiation pipe being connected to said water-cooling jacket; a tank being connected to said heat-radiation pipe; and a liquid driving means being connected to said tank; wherein an anti-freezing fluid is enclosed within said tank, and said anti-freezing fluid is circulated within said liquid circulation flow passage by means of said liquid driving means; and wherein said liquid circulation flow passage is attached on an interior surface of said case, while said water-cooling jacket is in contact with a circuit board mounting said heat-generating element thereon.

18. An electronic apparatus, receiving a liquid circulation flow passage within a case, comprising: a water-cooling jacket being thermally connected with a heat-generating element; a heat-radiation pipe being connected to said water-cooling jacket; a tank being connected to said heat-radiation pipe; and a liquid driving means being connected to said tank; wherein an anti-freezing fluid is enclosed within said tank, and said anti-freezing fluid is circulated within said liquid circulation flow passage by means of said liquid driving means; and wherein a pipe of said water-cooling jacket at an exit side and a pipe of said liquid driving means at an inlet side are thermally connected with each other.

19. An electronic apparatus, receiving a liquid circulation flow passage within a case, comprising: a water-cooling jacket being thermally connected with a heat-generating element; a heat-radiation pipe being connected to said water-cooling jacket; a tank being connected to said heat-radiation pipe; and a liquid driving means being connected to said tank; wherein an anti-freezing fluid is enclosed within said tank, and said anti-freezing fluid is circulated within said liquid circulation flow passage by means of said liquid driving means; and wherein said tank is made detachable with respect to said heat-radiation pipe, thereby providing collection means of the anti-freezing fluid within said liquid circulation flow passage.

20. An electronic apparatus, receiving a liquid circulation flow passage within a case, comprising: a water-cooling jacket being thermally connected with a heat-generating element; a heat-radiation pipe being connected to said water-cooling jacket; a tank being connected to said heat-radiation pipe; and a liquid driving means being connected to said tank; wherein an anti-freezing fluid is enclosed within said tank, and said anti-freezing fluid is circulated within said liquid circulation flow passage by means of said liquid driving means; and further comprising a detection means for detecting a change amount of the liquid within said liquid circulation flow passage, and an alarm means inputting an output from said detection means.

* * * * *